US011501272B2

(12) United States Patent
Spratt et al.

(10) Patent No.: US 11,501,272 B2
(45) Date of Patent: Nov. 15, 2022

(54) SYSTEMS AND METHODS FOR PROCESSING PREAUTHORIZED AUTOMATED BANKING MACHINE-RELATED TRANSACTIONS

(71) Applicant: MASTERCARD INTERNATIONAL INCORPORATED, Purchase, NY (US)

(72) Inventors: Michael Martel Spratt, Maryland Heights, MO (US); Rahul Deshpande, Chesterfield, MO (US); Akeda Hosten, St. Louis, MO (US); Stewart Boling, Maryland Heights, MO (US); Epher Mendoza, Wildwood, MO (US); Adam Axe, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/185,879

(22) Filed: Feb. 25, 2021

(65) Prior Publication Data
US 2021/0182816 A1 Jun. 17, 2021

Related U.S. Application Data

(63) Continuation of application No. 15/418,686, filed on Jan. 28, 2017, now abandoned.

(51) Int. Cl.
*G06Q 20/10* (2012.01)
*G06Q 20/40* (2012.01)
(Continued)

(52) U.S. Cl.
CPC ..... *G06Q 20/1085* (2013.01); *G06Q 20/3223* (2013.01); *G06Q 20/3224* (2013.01);
(Continued)

(58) Field of Classification Search
CPC ......... G06Q 20/1085; G06Q 20/40145; G06Q 20/40; G06Q 20/3224; G06Q 20/405;
(Continued)

(56) References Cited

U.S. PATENT DOCUMENTS 6,327,575 B1  12/2001 Katz
7,490,758 B2   2/2009 Drummond et al.
(Continued)

FOREIGN PATENT DOCUMENTS

EP  0884703 A2  12/1998

OTHER PUBLICATIONS

Philip Ryan, Peer-to-Peer Lending Gets Real With a P2P Atm, Jan. 10, 2014. Downloaded Jun. 18, 2022 from https://bankautomationnews.com/allposts/payments/peer-to-peer-lending-gets-real-with-a-p2p-atm/ (Year: 2014).*

(Continued)

*Primary Examiner* — Eric T Wong
*Assistant Examiner* — Claire A Rutiser

(57) ABSTRACT

Embodiments of the disclosure enable a transaction to be preauthorized. A system receives a request for preauthorization of a transaction including a transaction amount and a cardholder identifier, identifies a cardholder account based on the cardholder identifier, determines a transaction timeframe and a machine identifier, and accesses the cardholder account to determine whether to process the transaction in accordance with a nonvisual communication program. On condition that the transaction is to be processed in accordance with the nonvisual communication program, the system generates an instruction to identify a capture time, determine whether the capture time satisfies the transaction timeframe, and dispense the transaction amount of cash in accordance with the nonvisual communication program on condition that the capture time satisfies the transaction (Continued)

timeframe. Aspects of the disclosure provide for preauthorizing the transaction in a secure and user-friendly manner.

20 Claims, 8 Drawing Sheets

(51) Int. Cl.
*G07F 19/00* (2006.01)
*G06Q 20/32* (2012.01)

(52) U.S. Cl.
CPC .......... *G06Q 20/40* (2013.01); *G06Q 20/405* (2013.01); *G07F 19/203* (2013.01); *G07F 19/206* (2013.01); *G07F 19/211* (2013.01)

(58) Field of Classification Search
CPC ............. G06Q 20/4015; G06Q 20/389; G06Q 30/0205; G06Q 30/0261; G06Q 20/3223; G07F 19/203; G07F 19/206; G07F 19/211

See application file for complete search history.

(56) References Cited

U.S. PATENT DOCUMENTS

| | | | |
|---|---|---|---|
| 7,568,615 B2* | 8/2009 | Corona | G07F 19/211 235/379 |
| 8,083,141 B1 | 12/2011 | Courtright | |
| 8,301,564 B2 | 10/2012 | Mon et al. | |
| 8,348,151 B1* | 1/2013 | Block | G07F 19/20 235/379 |
| 8,590,787 B1 | 11/2013 | Courtright | |
| 8,738,450 B2 | 5/2014 | Mon et al. | |
| 9,098,846 B2* | 8/2015 | Gill | G06Q 20/322 |
| 10,885,751 B2 | 1/2021 | Hazard et al. | |
| 10,990,955 B2 | 4/2021 | Skelsey et al. | |
| 11,042,864 B1 | 6/2021 | Dixon et al. | |
| 11,354,632 B1* | 6/2022 | Hill | G06Q 20/4015 |
| 2002/0069170 A1 | 6/2002 | Rizzo et al. | |
| 2002/0082995 A1 | 6/2002 | Samuel | |
| 2005/0199714 A1 | 9/2005 | Brandt et al. | |
| 2006/0163341 A1* | 7/2006 | Tulluri | G06Q 20/1085 235/379 |
| 2007/0067642 A1* | 3/2007 | Singhal | G06F 21/34 713/186 |
| 2007/0282690 A1 | 12/2007 | Randazza et al. | |
| 2008/0046366 A1* | 2/2008 | Bemmel | H04L 9/32 705/44 |
| 2009/0198617 A1* | 8/2009 | Soghoian | G06Q 20/04 705/65 |
| 2009/0265273 A1* | 10/2009 | Guntupalli | G06Q 20/18 705/44 |
| 2009/0319360 A1 | 12/2009 | Salemi | |
| 2010/0042543 A1 | 2/2010 | Delgado et al. | |
| 2011/0055084 A1 | 3/2011 | Singh | |
| 2011/0071943 A1* | 3/2011 | Amann | G06Q 40/00 705/40 |
| 2011/0184865 A1 | 7/2011 | Mon et al. | |
| 2011/0196789 A1 | 8/2011 | Patton et al. | |
| 2011/0238573 A1* | 9/2011 | Varadarajan | G07F 19/20 705/43 |
| 2012/0239579 A1 | 9/2012 | Wolfs | |
| 2013/0005253 A1* | 1/2013 | Grigg | G06Q 20/1085 455/41.1 |
| 2013/0030999 A1 | 1/2013 | Chang et al. | |
| 2013/0124411 A1 | 5/2013 | Kobres et al. | |
| 2013/0339235 A1* | 12/2013 | Tulluri | G06Q 20/10 705/43 |
| 2013/0346312 A1 | 12/2013 | Calabrese et al. | |
| 2014/0263618 A1* | 9/2014 | McCarthy | G06Q 40/02 235/379 |
| 2014/0279490 A1* | 9/2014 | Caiman | G06Q 20/3224 705/43 |
| 2014/0324689 A1 | 10/2014 | Pinault | |
| 2015/0019424 A1 | 1/2015 | Pourfallah et al. | |
| 2015/0073984 A1* | 3/2015 | Andrews | G06Q 40/02 705/43 |
| 2016/0019537 A1 | 1/2016 | Raja et al. | |
| 2017/0061405 A1 | 3/2017 | Bryant | |
| 2017/0364871 A1 | 12/2017 | Kurian | |
| 2018/0047009 A1 | 2/2018 | Ayyagar et al. | |
| 2018/0089680 A1 | 3/2018 | Castinado et al. | |
| 2020/0288315 A1 | 9/2020 | Hanley et al. | |
| 2022/0084011 A1 | 3/2022 | Jamkhedkar et al. | |

OTHER PUBLICATIONS

Berthon, "International Search Report and Written Opinion", International Patent Application No. PCT/US17/0467168, dated Mar. 27, 2018, 13 pages.

Pous, Marc, et al. "Enhancing accessibility: Mobile to ATM case study." 2012 IEEE Consumer Communications and Networking Conference (CCNC). IEEE, 2012. (Year: 2012), 5 pages.

Aaron Braverman, No. cards required, New ATMs more accessible to disabled, https://www.creditcards.com/credit-card-news/ new-atms-more-accessible-disabled/, Dec. 6, 2016 (Year: 2016), 8 pages.

Omolara et al., "Fingereye: improvising security and optimizing ATM transaction time based on iris-scan authentication" International Journal of Electrical and Computer Engineering, Jun. 2019, 9 pages, https://www.researchgate.net/publication/333538332.

\* cited by examiner

SYSTEMS AND METHODS FOR PROCESSING PREAUTHORIZED AUTOMATED BANKING MACHINE-RELATED TRANSACTIONS

FIELD OF THE DISCLOSURE

The subject matter described herein relates generally to information processing and, more specifically, to systems and methods for processing one or more preauthorized automated banking machine-related transactions.

BACKGROUND

Automated banking machines have made great gains as a means to attract financial accounts to financial institutions. For example, at least some automated banking machines have made it easier for cardholders to enter into at least some financial transactions, such as deposit transactions, cash withdrawal transactions, and check cashing transactions. At least some cardholders, however, are deterred from using automated banking machines for various reasons. A cardholder who prefers to enter into a financial transaction using nonvisual communication, for example, may perceive that using at least some known automated banking machines is risky, tedious, and/or time-consuming.

SUMMARY

Embodiments of the disclosure enable a computing system to preauthorize one or more financial transactions. The computing system includes a memory device storing data associated with one or more cardholder accounts and computer-executable instructions, and a processor. The processor executes the computer-executable instructions to receive a request for preauthorization of a financial transaction including a transaction amount and a cardholder identifier, identify a cardholder account based on the cardholder identifier, determine a transaction timeframe and a machine identifier associated with the financial transaction, and access the cardholder account to determine whether to process the financial transaction in accordance with a nonvisual communication program. On condition that the financial transaction is to be processed in accordance with the nonvisual communication program, the processor is configured to generate an instruction to identify a capture time associated with the financial transaction, determine whether the capture time satisfies the transaction timeframe, and dispense the transaction amount of cash in accordance with the nonvisual communication program on condition that the capture time satisfies the transaction timeframe.

In another aspect, one or more computer storage media embodied with computer-executable instructions are provided. The computer storage media includes a preauthorization component, a detection component, and a dispenser component. The preauthorization component obtains a preauthorization message associated with a financial transaction, and analyzes the preauthorization message to identify a transaction amount and a cardholder account associated with the financial transaction. The detection component determines that a cardholder associated with the cardholder account is proximate to a cash machine, identifies a capture time associated with the financial transaction, and determines whether the capture time satisfies the transaction timeframe. The dispenser component dispenses the transaction amount of cash in accordance with a nonvisual communication program.

In yet another aspect, a computer-implemented method is provided for preauthorizing one or more financial transactions. The computer-implemented method includes identifying a request for preauthorization of a financial transaction including a transaction amount and a cardholder identifier, determining a transaction timeframe associated with the financial transaction, identifying a cash machine associated with the financial transaction, and determining whether to process the financial transaction in accordance with a nonvisual communication program. On condition that the financial transaction is to be processed in accordance with the nonvisual communication program, the computer-implemented method includes generating a preauthorization instruction to dispense the transaction amount of cash in accordance with the nonvisual communication program upon determining that a capture time associated with the financial transaction satisfies the transaction timeframe.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
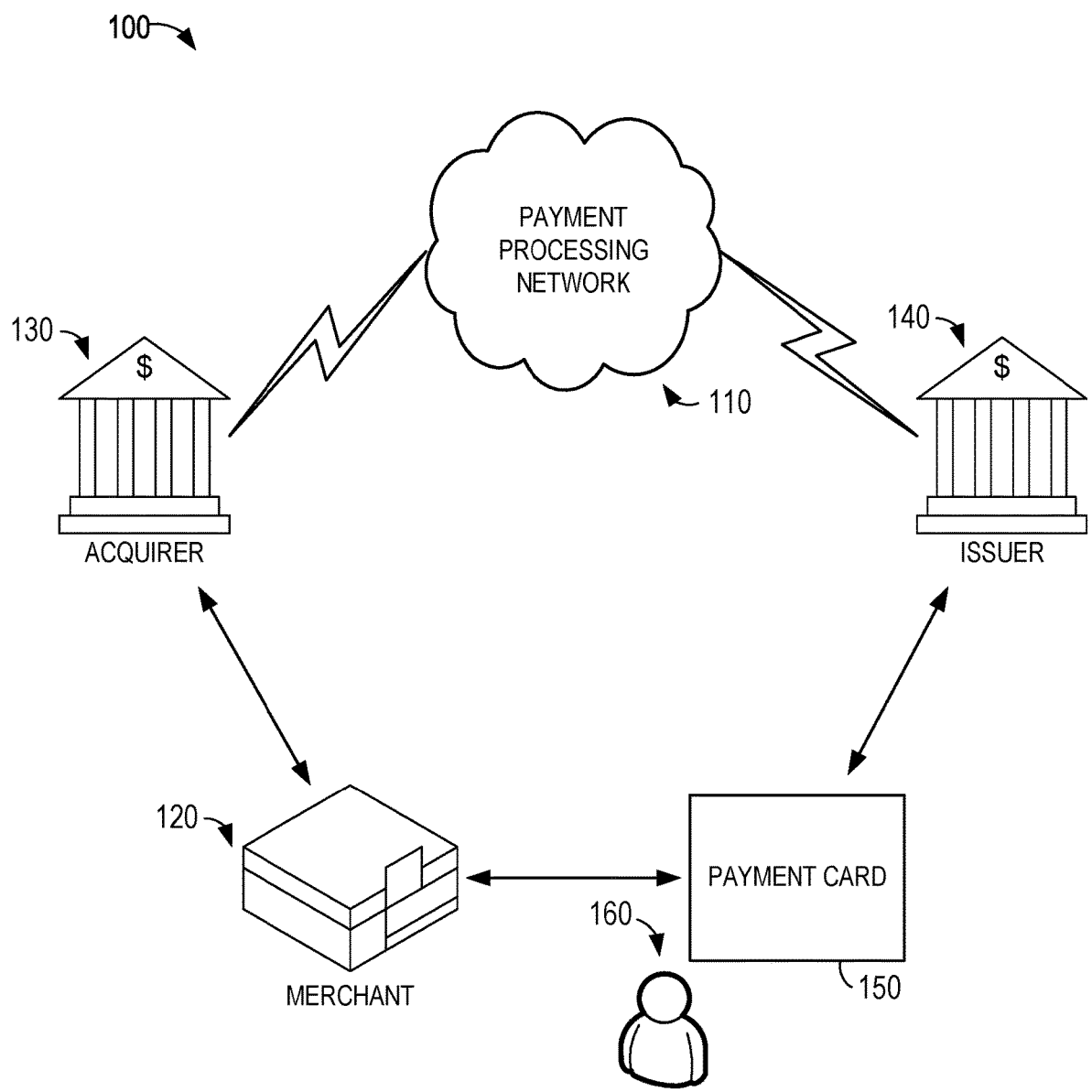
FIG. 1 is a block diagram illustrating an example environment for processing financial transactions.

The subject matter described herein relates to processing one or more automated banking machine-related financial transactions. Embodiments of the disclosure enable a cardholder to obtain authorization of a financial transaction prior to realizing or carrying out the financial transaction at an automated banking machine, such as an automated teller machine (ATM). The financial transaction may be preauthorized, for example, in a trusted environment. For example, a user device associated with the cardholder may be used to enter into the financial transaction and/or obtain authorization of the financial transaction. In this manner, the cardholder may approach the automated banking machine with increased confidence that the interaction with the automated banking machine will be favorable, quick, and efficient. At least some embodiments described herein preauthorize financial transactions and/or carry out the preauthorized financial transactions in accordance with a nonvisual communication program.

While no personally identifiable information is tracked by the embodiments described herein, the embodiments have been described with reference to data being monitored and/or collected from one or more users (e.g., the cardholder). The data may be monitored and/or collected in accordance with applicable data privacy laws and regulations. For example, notice may be provided to the users (e.g., via a dialog box or preference setting), and/or users may be given the opportunity to give or deny consent for the monitoring and/or collection of the data. The consent may take the form of opt-in consent or opt-out consent.

Aspects of the disclosure provide for a computing system that performs one or more operations in an environment including a plurality of devices coupled to each other via a network (e.g., a local area network (LAN), a wide area network (WAN), the Internet). For example, a cashier system may communicate with a user device and/or a financial transaction processing computing device to perform one or more operations in a financial transaction processing environment. In some embodiments, the cashier system facilitates dataflow between the user device and the financial transaction processing computing device to enable a cardholder to obtain preauthorization of a financial transaction and carry out the preauthorized financial transaction at an automated banking machine efficiently and effectively.

The systems and processes described herein may be implemented using computer programming or engineering techniques including computer software, firmware, hardware or a combination or subset thereof. At least one technical problem with known computing systems is that it can be risky, tedious, and/or time-consuming to process at least some financial transactions. The embodiments described herein address at least this technical problem. By preauthorizing financial transactions and carrying out the preauthorized financial transactions in the manner described in this disclosure, some embodiments reduce fraud and/or processing costs, increase user efficiency and/or user confidence, and/or improve user experience and/or user interaction performance. Additionally, some embodiments improve data integrity, data transmission security, and/or communication between systems by allowing a financial transaction to be authorized in a trusted environment; and/or reduce error rate by automating at least a portion of the transaction authorization process. Moreover, some embodiments may facilitate improving processor speed, processor security, and/or operating system resource allocation.

The technical effect of the systems and processes described herein is achieved by performing at least one of the following operations: a) analyzing a request for preauthorization of a financial transaction; b) determining a transaction timeframe and a machine identifier; c) analyzing user location data and machine location data to identify a transaction timeframe; d) analyzing user location data and time data to identify a cash machine; e) generating a prompt to select a set of cash machines; f) analyzing user input associated with a selection of the set of cash machines; g) determining whether to process the financial transaction in accordance with a nonvisual communication program; h) generating an instruction to identify a capture time associated with the financial transaction, i) generating an instruction to determine whether the capture time satisfies the transaction timeframe; j) generating an instruction to dispense the transaction amount of cash; k) determining whether a hold duration associated with the financial transaction exceeds a hold threshold; l) generating a request to modify the transaction timeframe and/or identify another cash machine; m) analyzing position data to determine whether a user device or access card is proximate to the cash machine; n) detecting a transmission associated with an object; o) scanning a predetermined scan area to generate scan data associated with an object; p) analyzing the scan data to identify an identifier associated with the object; q) determining whether the object is associated with the cardholder account; and r) identifying a notification indicative of the transaction amount of cash being dispensed.

FIG. 1 is a block diagram illustrating an example environment 100 for processing one or more financial transactions. The environment 100 includes a processing network 110, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 100 includes one or more merchants 120 that accept payment via the processing network 110. To accept payment via the processing network 110, the merchant 120 establishes a financial account with an acquirer 130 that is a member of the processing network 110. The acquirer 130 is a financial institution that maintains a relationship with one or more merchants 120 to enable the merchants 120 to accept payment via the processing network 110. The acquirer 130 may also be known as an acquiring bank, a processing bank, or a merchant bank.

The environment 100 includes one or more issuers 140 that issue or provide one or more payment cards 150 to one or more cardholders 160 or, more broadly, account holders ("cardholder" and "account holder" may be used interchangeably herein). An issuer 140 is a financial institution that maintains a relationship with a cardholder 160 to enable the cardholder 160 to make a payment using a payment card 150 via the processing network 110. As described herein, the term "payment card" includes credit cards, debit cards, prepaid cards, key fobs, digital cards, smart cards, and any other payment product that is linked or associated with a corresponding cardholder account maintained by the issuer 140.

The cardholder 160 may use the payment card 150 to enter into one or more financial transactions with one or more merchants 120. The payment card 150 may have any shape, size, or configuration that enables the cardholder 160 to make a payment to a merchant 120 using a cardholder account. For example, account information stored in a microchip or magnetic stripe on the payment card 150 may be used to identify a cardholder account associated with the payment card 150. In some embodiments, the payment card 150 uses mobile payment technology and/or contactless payment technology to facilitate communication between the cardholder 160 and the merchant 120. For example, the payment card 150 may include or be associated with a radio frequency identification (RFID)-enabled device, a BLUETOOTH® brand wireless technology-enabled device, a WI-FI® brand local area wireless computing network-enabled device, and/or a near field communication (NFC) wireless communication-enabled device. (BLUETOOTH® is a registered trademark of Bluetooth Special Interest Group, and WI-FI® is a registered trademark of the Wi-Fi Alliance).

In some embodiments, the cardholder 160 presents the merchant 120 with the payment card 150 to make a payment to the merchant 120 using the cardholder account in exchange for the good or service. Alternatively, the cardholder 160 may provide the merchant 120 with account information associated with the payment card 150 without physically presenting the payment card 150 to the merchant 120 (e.g., for remote financial transactions, including e-commerce transactions, card-not-present transactions, or card-on-file transactions). Account information may include, for example, a name of the cardholder 160, an account number, an expiration date, and/or a security code (e.g., a card verification value (CVV), a card verification code (CVC), a personal identification number (PIN)).

The merchant 120 requests authorization from an acquirer 130 for at least the amount of the purchase. The merchant 120 may request authorization using any financial transaction computing device configured to transmit account information of the cardholder 160 to one or more financial transaction processing computing devices of the acquirer 130. For example, the merchant 120 may use a point-of-sale (POS) terminal that reads account information from the microchip or magnetic stripe on the payment card 150 and transmits the account information to a financial transaction processing computing device of the acquirer 130. Additionally or alternatively, the POS terminal may receive the account information from a communication device using mobile payment technology and/or contactless payment technology, and transmit the account information to the financial transaction processing computing device of the acquirer 130.

Using the processing network 110, the financial transaction processing computing device of the acquirer 130 communicates with one or more financial transaction processing computing devices of an issuer 140 to determine whether the account information of the cardholder 160 matches or corresponds to the account information of the issuer 140, whether the cardholder account is in good standing, and/or whether the purchase is covered by an available credit line or account balance associated with the cardholder account (e.g., a purchase amount is less than an account capacity). Based on these determinations, a financial transaction processing computing device of the issuer 140 determines whether to approve or decline the request for authorization from the merchant 120.

If the request for authorization is declined, the merchant 120 is notified (e.g., via the processing network 110) as such, and may request authorization from the acquirer 130 for a lesser amount or request an alternative form of payment (e.g., cash, another payment card 150) from the cardholder 160. If the request for authorization is approved, an authorization code is issued (e.g., via the processing network 110) to the merchant 120, and the available credit line or account balance associated with the cardholder account is decreased by at least the amount of the purchase. The financial transaction is then settled between the merchant 120, the acquirer 130, the issuer 140, and/or the cardholder 160. Settlement typically includes the acquirer 130 reimbursing the merchant 120 for selling the good or service, and the issuer 140 reimbursing the acquirer for reimbursing the merchant 120. When a credit card is used, the issuer 140 may bill the cardholder 160 to settle the cardholder account (e.g., a credit card account) with the cardholder 160. When a debit or prepaid card is used, the issuer 140 may automatically withdraw funds from the cardholder account (e.g., a checking account, a savings account) to settle the cardholder account.

Figure 2:
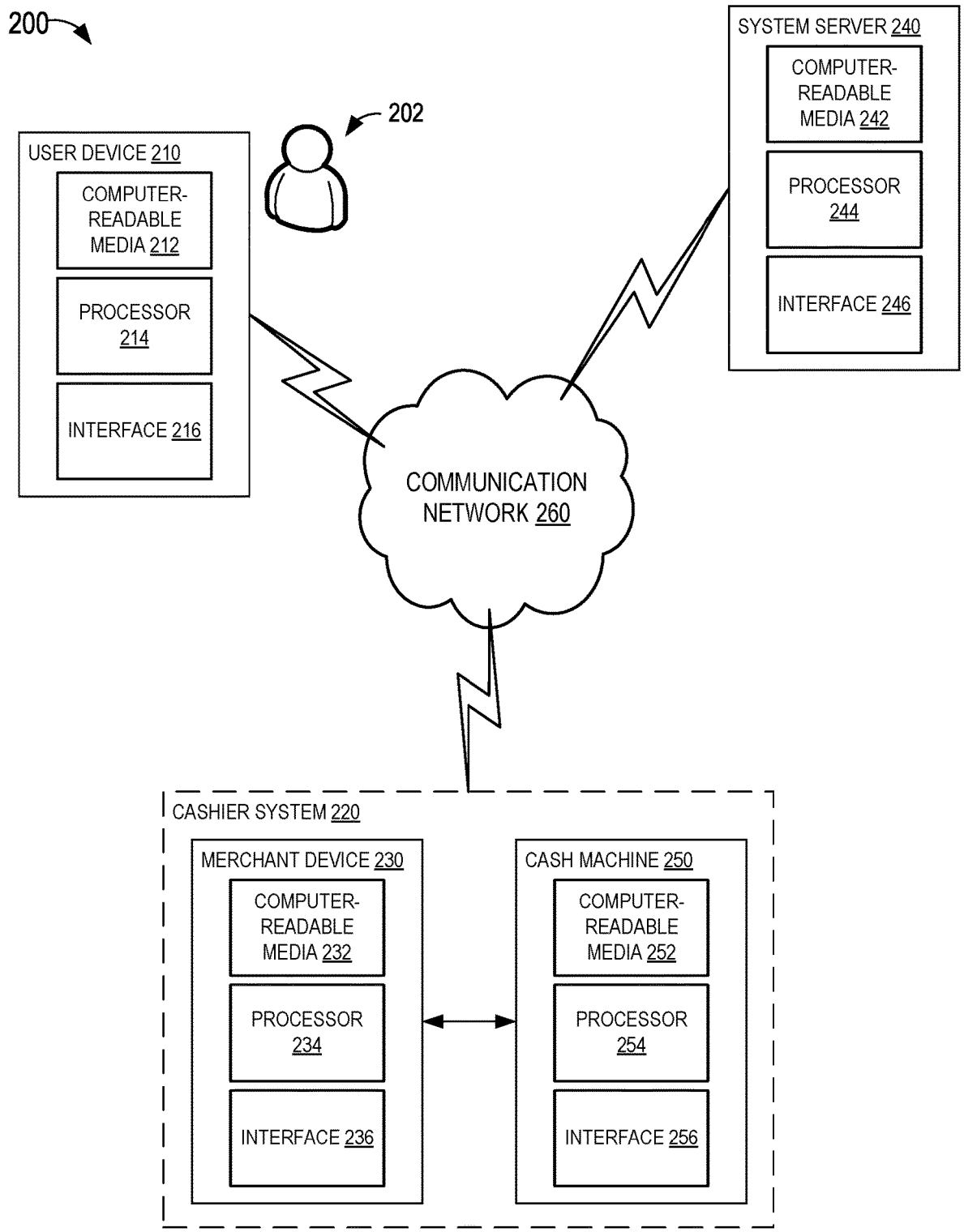
FIG. 2 is a block diagram illustrating an example ecosystem for processing financial transactions in an environment, such as the environment shown in FIG. 1.

FIG. 2 is a block diagram illustrating an example ecosystem 200 for allowing a user 202 (e.g., cardholder 160) to obtain preauthorization of one or more financial transactions and/or carry out the preauthorized financial transactions in the environment 100. The user 202 may use a user device 210 to enter into a financial transaction (e.g., a first financial transaction).

The user device 210 includes one or more memory devices or computer-readable media 212 storing computer-executable instructions, and one or more processors 214 configured to execute the computer-executable instructions to perform one or more operations, such as obtain account information associated with the user 202. In some embodiments, a processor 214 executes or runs one or more applications (apps) to perform the operations. A payment card app, for example, may be used to enter into a financial transaction. A global positioning system (GPS) app, for another example, may be used to identify a position of the user device 210.

The user device 210 may use one or more interfaces 216 to present information to and/or receive user input from a user of the user device 210 (e.g., user 202). For example, an interface 216 may be used to receive user input indicative of the account information. The interfaces 216 may also be used to transmit data to and/or receive data from one or more other computing systems. For example, an interface 216 may be used to transmit account information to a cashier system 220 for facilitating the financial transaction. The user device 210 may include an instance of an application (e.g., a client-side application) that enables the user device 210 to communicate with another computing system (e.g., a cloud-computing provider) that performs one or more backend operations using a counterpart application (e.g., server-side application) and/or through one or more server-side services.

The cashier system 220 includes a merchant device 230 configured to obtain the account information for facilitating the financial transaction. The merchant device 230 may be associated, for example, with a retailer or a financial institution. The merchant device 230 includes one or more memory devices or computer-readable media 232 storing computer-executable instructions, and one or more processors 234 configured to execute the computer-executable instructions to perform one or more operations, such as generate a request for preauthorization of the financial transaction. In some embodiments, a processor 234 executes or runs one or more applications to perform the operations. A payment card app, for example, may be used to facilitate the financial transaction.

The merchant device 230 may use one or more interfaces 236 to present information to and/or receive user input from a user of the merchant device 230 (e.g., merchant 120). The interfaces 236 may also be used to transmit data to and/or receive data from one or more other computing systems (e.g., user device 210). For example, an interface 236 may be used to receive the account information from the user device 210. For another example, an interface 236 may be used to transmit the request for preauthorization to a system server 240 (e.g., a financial transaction processing computing device of an issuer 140) for processing the financial transaction.

The merchant device 230 may include a server-side application that enables one or more client-side services to be provided at one or more other computing systems (e.g., user device 210). Additionally or alternatively, the merchant device 230 may include a client-side application that enables the merchant device 230 to communicate with a cloud-computing provider (e.g., the system server 240) that performs one or more backend operations using a server-side application and/or through one or more server-side services.

The system server 240 is configured to obtain the request for preauthorization for processing the financial transaction. The system server 240 includes one or more memory devices or computer-readable media 242 storing computer-executable instructions, and one or more processors 244 configured to execute the computer-executable instructions to perform one or more operations, such as generate one or more preauthorization messages associated with the financial transaction. Preauthorization messages may include, for example, a notification, an instruction, a prompt, and the like. In some embodiments, a processor 244 executes or runs one or more applications to perform the operations. A payment card app, for example, may be used to process the financial transaction.

The system server 240 may use one or more interfaces 246 to present information to and/or receive user input from a user of the system server 240 (e.g., issuer 140). The interfaces 246 may also be used to transmit data to and/or receive data from the other computing systems (e.g., user device 210, merchant device 230). For example, an interface 246 may be used to receive the request for preauthorization from the cashier system 220. For another example, an interface 246 may be used to transmit a preauthorization message to the user device 210 used to enter into the financial transaction, another user device 210 associated with the user 202 (e.g., a mobile device), and/or the cashier system 220 for carrying out the financial transaction.

The system server 240 may include a server-side application that enables one or more client-side services to be provided at one or more other computing systems (e.g., user device 210, merchant device 230). Additionally or alternatively, the system server 240 may include a client-side application that enables the system server 240 to communicate with a cloud-computing provider that performs one or more backend operations using a server-side application and/or through one or more server-side services.

The cashier system 220 includes one or more cash machines 250 configured to obtain the preauthorization message for carrying out the financial transaction. A cash machine 250 may be included in, coupled to, and/or associated with the merchant device 230. The cash machine 250 includes one or more memory devices or computer-readable media 252 storing computer-executable instructions, and one or more processors 254 configured to execute the computer-executable instructions to perform one or more operations, such as carry out the financial transaction. In some embodiments, a processor 254 executes or runs one or more applications to perform the operations. A payment card app, for example, may be used to carry out the financial transaction. A GPS app, for another example, may be used to identify a position of the cash machine 250.

The cash machine 250 may use one or more interfaces 256 to transmit data to and/or receive data from the other computing systems (e.g., user device 210, merchant device 230, system server 240). For example, an interface 256 may be used to receive a preauthorization message from the merchant device 230 and/or system server 240. The interfaces 256 may also be used to present information to and/or receive user input from a user of the cash machine 250 (e.g., merchant 120, user 202). For example, an interface 256 may be used to present a preauthorization message to the user of the cash machine 250.

A manned cash machine 250 enables a user affiliated with the merchant 120, such as a cashier at a retailer or a teller at a financial institution, to service a customer or client of the merchant 120 (e.g., user 202) for carrying out the financial transaction. An automated cash machine 250, such as a self-serve kiosk at a retailer or an automated banking machine (e.g., ATM) at a financial institution, enables the user 202 to carry out the financial transaction with little or no assistance from a user affiliated with the merchant 120.

The cash machine 250 may include a client-side application that enables the cash machine 250 to communicate with a cloud-computing provider (e.g., merchant device 230, system server 240) that performs one or more backend operations using a server-side application and/or through one or more server-side services. For example, a thin client included in, coupled to, and/or associated with the cash machine 250 may provide remote access to the merchant device 230 and/or system server 240 for performing one or more backend operations.

The ecosystem 200 includes one or more communication networks 260 that enable information to be communicated between a plurality of computing or communication systems coupled to the communication networks 260 (e.g., user device 210, cashier system 220, merchant device 230, system server 240, cash machine 250). Example communication networks 260 include a cellular or mobile network and the Internet. Alternatively, the communication networks 260 may include any communication medium that enables the ecosystem 200 to function as described herein including, for example, a personal area network (PAN), a LAN, and/or a WAN.

Figure 3:
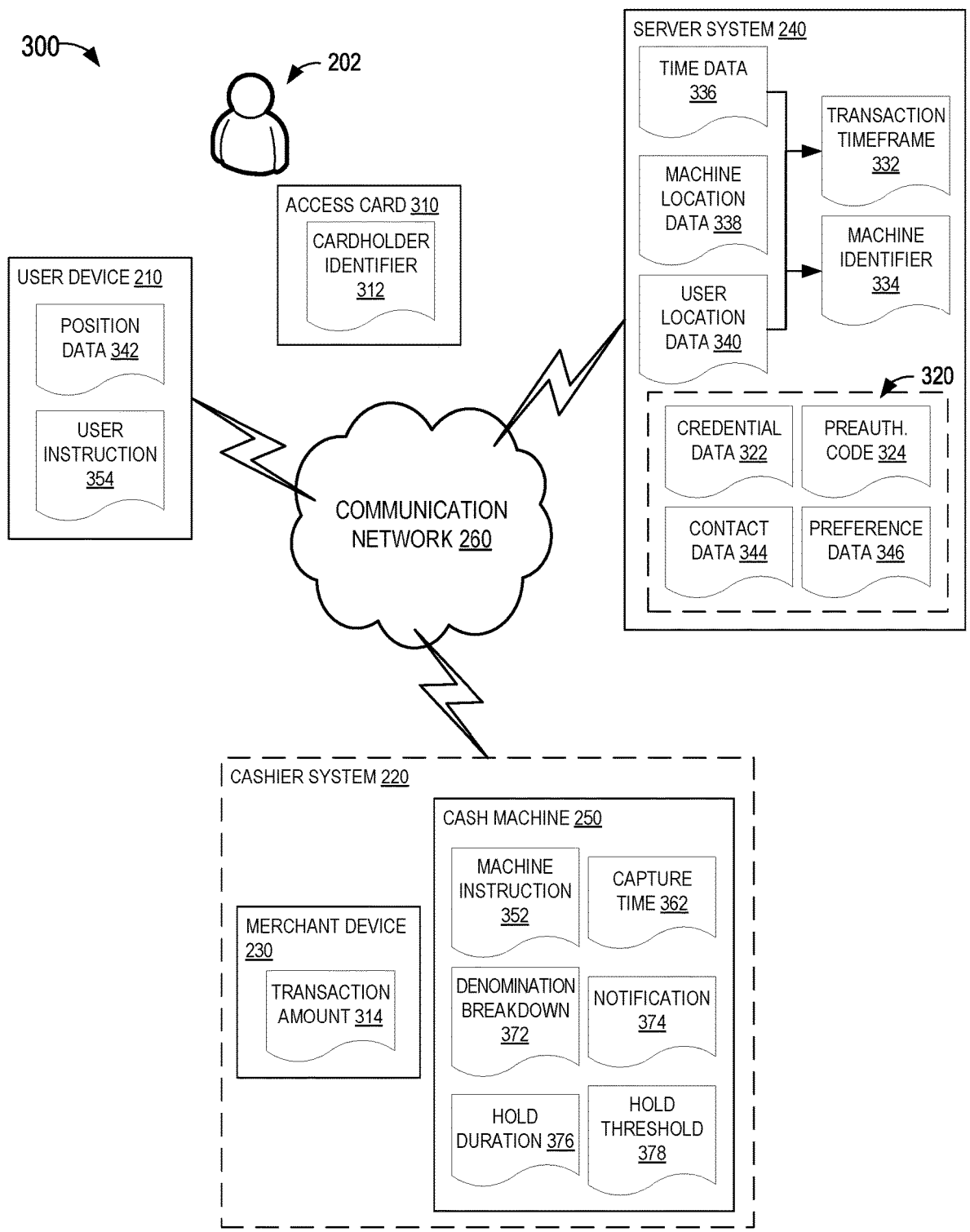
FIG. 3 is a block diagram illustrating an example computing system for processing preauthorized financial transactions in an ecosystem, such as the ecosystem shown in FIG. 2.

FIG. 3 is a block diagram illustrating an example computing system 300 that may be used to process one or more preauthorized financial transactions in the ecosystem 200. A user 202 may use a user device 210 to obtain authorization to withdraw or obtain cash at a cash machine 250 remote from the user device 210. Cash may be obtained, for example, through a cash withdrawal action that allows funds to be withdrawn from a user account (e.g., checking account, savings account) and/or through a cash disbursement action that allows funds to be "purchased" using the user account (e.g., credit card account).

The user device 210 may be used to provide a merchant device 230 associated with the cash machine 250 with account information associated with an access card 310 (e.g., payment card 150), such as a cardholder identifier 312. The account information may be provided without physically presenting the payment card 150 to the merchant device 230 and/or to the cash machine 250. The access card 310 may be, for example, an EMV® brand smart card. (EMV® is a registered trademark of EMVCo, LLC). In some embodiments, the account information includes data indicative of an enrollment status associated with a nonvisual communication program. The merchant device 230 uses the account information to generate a request for preauthorization of a financial transaction, and transmits the request to a system server 240 for processing the financial transaction. The request may include, for example, the account information and a transaction amount 314.

In response to receiving the request for preauthorization, the system server 240 analyzes the request to identify the cardholder identifier 312, and uses the cardholder identifier 312 to identify a cardholder account 320 associated with the cardholder identifier 312. The cardholder account 320 may be identified or selected, for example, from one or more cardholder accounts stored and/or maintained at the system server 240. In some embodiments, the system server 240 identifies, from the cardholder accounts, a first cardholder account (e.g., cardholder account 320) associated with credential data 322 that matches or corresponds to the cardholder identifier 312. Credential data 322 includes any data that enables an entity (e.g., user 202, user device 210) to be identified and/or authenticated. Credential data 322 may include, for example, an account number, a username, a PIN, a password, a public key infrastructure (PKI) certificate, a token, biometric data, and the like.

The system server 240 uses account data associated with the cardholder account 320 to process the financial transaction. In some embodiments, the system server 240 identifies an account threshold (e.g., an available credit line, an available account balance) associated with the cardholder account 320, and determines whether the transaction amount 314 exceeds the account threshold. If the transaction amount 314 is less than or equal to the account threshold, the system server 240 approves the request for preauthorization, reserves or allocates preauthorized funds, and generates a response to the request in accordance with the approval. The response may include, for example, a preauthorization code 324 that may be used to authenticate a holder of the preauthorization code 324 for obtaining or capturing the preauthorized funds. If the transaction amount 314 is greater than the account threshold, the system server 240 declines the request for preauthorization and generates a response to the request in accordance with the declination.

Preauthorized funds may be obtained or captured at a cash machine 250, for example, to realize or carry out the financial transaction. In some embodiments, the system server 240 identifies or determines a transaction timeframe 332 in which the preauthorized funds may be captured for carrying out the financial transaction. Additionally, the system server 240 may identify or determine one or more machine identifiers 334 associated with one or more cash machines 250 at which the preauthorized funds may be captured for carrying out the financial transaction. The transaction timeframe 332 and/or machine identifiers 334 may be determined based on time data 336, machine location data 338 associated with one or more geolocations of the cash machines 250, and/or user location data 340 associated with a geolocation of the user 202. In some embodiments, the system server 240 identifies and/or generates the time data 336, machine location data 338, and/or user location data 340 based on user input. For example, the request for preauthorization may be analyzed to identify and/or generate the time data 336, machine location data 338, and/or user location data 340. For another example, the user 202 may be prompted to identify a desired time and/or geolocation.

In some embodiments, the system server 240 identifies and/or generates the user location data 340 based on position data 342 (e.g., GPS data). The position data 342 may be associated with an object that is associated with the user 202, such as the user device 210 or the access card 310. Contact data 344 associated with the cardholder account 320, for example, may be used to communicate with one or more user devices 210 associated with the user 202 for obtaining the position data 342. Contact data 344 includes any data that enables an entity (e.g., user 202, user device 210) to be located and/or approached for communicating with the entity. Contact data 344 may include, for example, a telephone number, a BLUETOOTH® brand wireless technology identifier, a routing number, an Internet Protocol (IP) address, a media access controller (MAC) address, an NFC identifier, an RFID identifier, and the like.

The time data 336, machine location data 338, and/or user location data 340 may be identified, generated, and/or modified in accordance with preference data 346 associated with the cardholder account 320. Preference data 346 may be indicative of one or more tastes, tendencies, or biases of an entity (e.g., user 202). Tastes, tendencies, and/or biases may be expressed by the user 202 (e.g., via user input) or implied based on other data associated with the user 202. For example, a transaction history indicative of a repeated time and/or geolocation may be indicative of a preference for the repeated time and/or geolocation.

The system server 240 generates one or more preauthorization messages that enable the user 202 to carry out the financial transaction within the transaction timeframe 332 and/or at a predetermined cash machine 250. The preauthorization messages may include, for example, a machine instruction 352 and/or a user instruction 354. The machine instruction 352 may be transmitted to one or more predetermined cash machines 250 such that the predetermined cash machines 250 are configured to perform one or more operations for carrying out the financial transaction. The user instruction 354 may be transmitted to the user device 210 used to enter into the financial transaction, a user device 210 different from the user device 210 used to enter into the financial transaction, and/or the predetermined cash machines 250 such that a user device 210 and/or a predetermined cash machine 250 is configured to present the user instruction 354 to the user 202.

The user 202 may follow the user instruction 354 to capture the preauthorized funds within the transaction timeframe 332 at a predetermined cash machine 250. In some embodiments, the cashier system 220 (e.g., merchant device 230, cash machine 250) identifies a capture time 362 associated with a moment the preauthorized funds are captured. The capture time 362 may be identified, for example, upon receiving the preauthorization code 324. The capture time 362 may also be identified, for another example, upon identifying that the user 202 is proximate to the predetermined cash machine 250.

In some embodiments, the cashier system 220 scans a predetermined scan area proximate to the cash machine 250 to generate scan data, and analyzes the scan data to determine whether the user 202 is proximate to the predetermined cash machine 250. For example, the cashier system 220 may generate scan data associated with a user device 210 and/or access card 310 presented to the cash machine 250 for capturing the preauthorized funds. For another example, the cashier system 220 may generate scan data associated with the user 202, user device 210, and/or access card 310 approaching the cash machine 250 for capturing the preauthorized funds. The scan data may be analyzed to authenticate the user 202 in the predetermined scan area as being authorized to capture the preauthorized funds. Additionally or alternatively, the cashier system 220 receives position data 342 associated with the user device 210 and/or access card 310, and analyzes the position data 342 to determine whether the user 202 is proximate to the predetermined cash machine 250 for authenticating the user 202.

Upon identifying the capture time 362, the cashier system 220 determines whether the capture time 362 satisfies the transaction timeframe 332. If the capture time 362 is less than or equal to the transaction timeframe 332 (e.g., the transaction timeframe 332 has not expired or "timed out"), the cash machine 250 dispenses an amount of cash associated with the transaction amount 314. In some embodiments, the cash machine 250 dispenses the amount of cash in accordance with a denomination breakdown 372. The denomination breakdown 372 may be included in the machine instruction 352. For example, the denomination breakdown 372 may be identified based on the request for preauthorization and/or preference data 346. Alternatively, the user 202 may be prompted to identify a desired denomination breakdown 372.

Upon dispensing the amount of cash associated with the transaction amount 314, the cashier system 220 generates and transmits a notification 374 that is indicative of the amount of cash being dispensed. The notification 374 may be received, for example, at the system server 240 to enable the system server 240 to recognize or identify the financial transaction as being realized or carried out. On condition that a capture time 362 is not or yet to be identified, the cashier system 220 and/or system server 240 may periodically (e.g., each predetermined interval of time) and/or systematically (e.g., each predetermined occurrence) determine whether a hold duration 376 associated with the preauthorized funds satisfies one or more predetermined hold thresholds 378.

If the hold duration 376 exceeds a predetermined hold threshold 378, the transaction timeframe 332 may be extended or increased and/or a more-proximate or more-convenient cash machine 250 may be identified. In some embodiments, the cashier system 220 and/or system server 240 communicates with the user device 210 to prompt the user 202 to modify the transaction timeframe 332 and/or identify another cash machine 250. If the hold duration 376 exceeds the transaction timeframe 332 (e.g., a capture time 362 is not identified before the transaction timeframe 332 expires or "times out"), the preauthorized funds are released to enable the system server 240 to allocate the funds towards another financial transaction, including another preauthorized financial transaction.

In some embodiments, the cashier system 220 and/or system server 240 determines whether to process the financial transaction in accordance with a nonvisual communication program. For example, the cashier system 220 and/or system server 240 may determine whether the cardholder account 320 is enrolled in or associated with a nonvisual communication program. If the cardholder account 320 is associated with the nonvisual communication program, the cashier system 220 and/or system server 240 communicates with the user 202 using nonvisual communication (e.g., at the user device 210, the merchant device 230, and/or the cash machine 250). A cardholder account may be enrolled in the nonvisual communication program, for example, if a user of the cardholder account is blind or prefers to communicate using one or more nonvisual communications, such as an audible communication and/or a tactile communication. In some embodiments, the cashier system 220 and/or system server 240 uses or analyzes preference data 346 to identify an enrollment status of the cardholder account 320.

Figure 4:
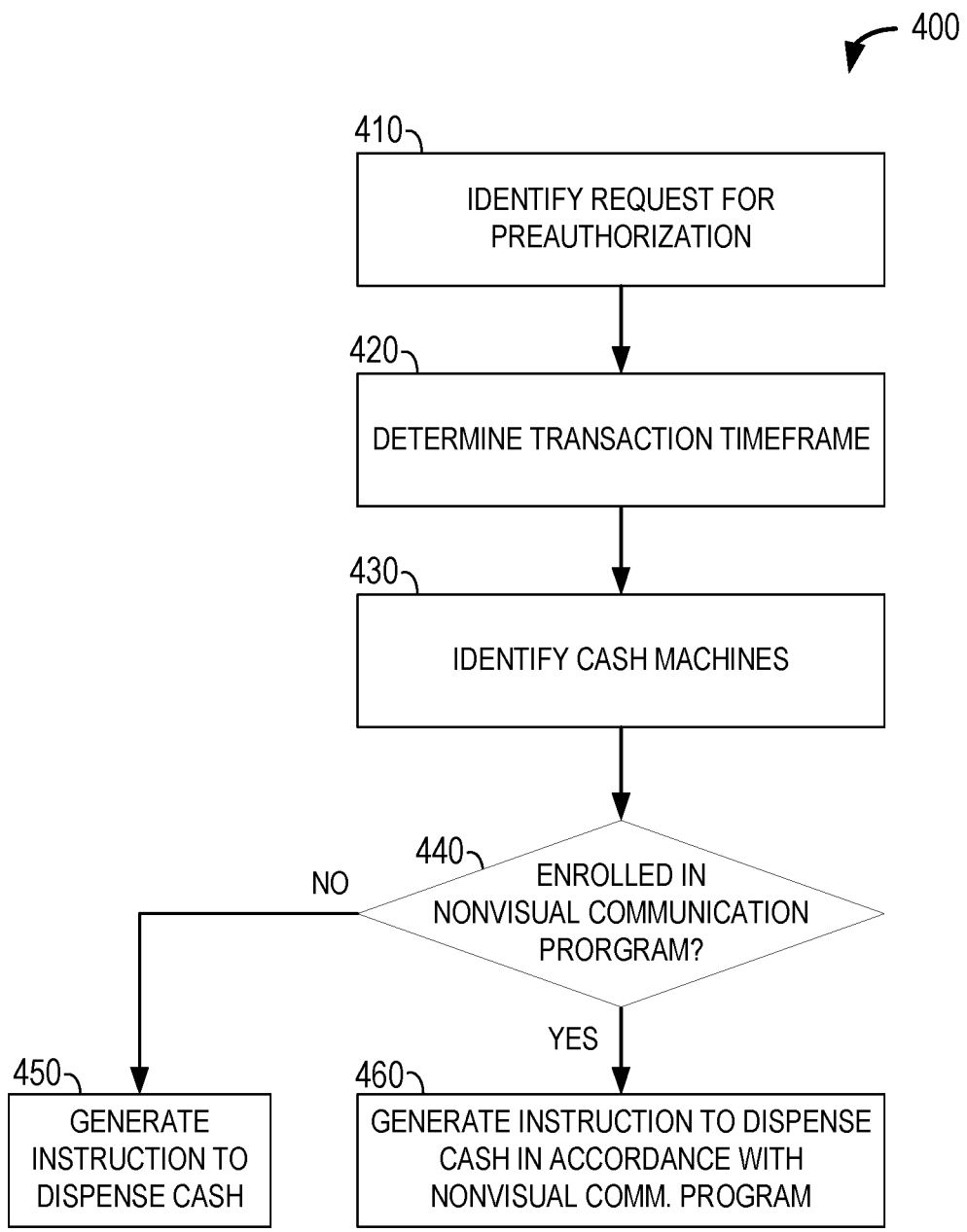
FIG. 4 is a flowchart of an example method for processing preauthorized financial transactions using a computing system, such as the computing system shown in FIG. 3.

FIG. 4 is a flowchart illustrating an example method 400 for processing a preauthorized financial transaction in the ecosystem 200 using a computing system (e.g., merchant device 230, system server 240). A request for preauthorization of a financial transaction is identified at 410. The request for preauthorization may be generated at and/or received from, for example, a cashier system 220. In some embodiments, the request for preauthorization includes a cardholder identifier 312 and a transaction amount 314.

Upon approving the request for preauthorization, a transaction timeframe 332 in which preauthorized funds may be captured is determined at 420, and one or more cash machines 250 at which the preauthorized funds may be captured are identified at 430. The transaction timeframe 332 and/or cash machines 250 may be determined and/or identified based on one or more communications with the user device 210. For example, the request for preauthorization may be analyzed to identify the transaction timeframe 332, one or more machine identifiers 334, time data 336, machine location data 338, and/or user location data 340. For another example, position data 342 associated with the user device 210 and/or access card 310 may be received. For yet another example, a user of the user device 210 (e.g., user 202) may be prompted to identify a desired time and/or geolocation for capturing the preauthorized funds. In some embodiments, preference data 346 associated with a cardholder account 320 used to enter into the financial transaction may be used to determine, identify, and/or modify the transaction timeframe 332, machine identifiers 334, time data 336, machine location data 338, and/or user location data 340.

Preference data 346 may also be used to determine whether to process the financial transaction in accordance with a nonvisual communication program. For example, preference data 346 may be used to determine at 440 whether the cardholder account 320 is associated with the nonvisual communication program. If the cardholder account 320 is not enrolled in the nonvisual communication program, an instruction is generated at 450 to dispense cash in a conventional manner. For example, the instruction may configure the cash machine 250 to use visual prompts and/or instructions for carrying out the financial transaction.

On the other hand, if the financial transaction is to be processed in accordance with the nonvisual communication program (e.g., if the cardholder account 320 is enrolled in the nonvisual communication program), a machine instruction 352 is generated at 460 to dispense cash in accordance with the nonvisual communication program. For example, the machine instruction 352 may configure the cash machine 250 to use nonvisual prompts and/or instructions for carrying out the financial transaction. For another example, the machine instructions 352 may configure the cash machine 250 to dispense cash in a manner that allows the user 202 to confirm or verify that the transaction amount 314 of cash was dispensed from the cash machine 250 using nonvisual cues.

Figure 5:
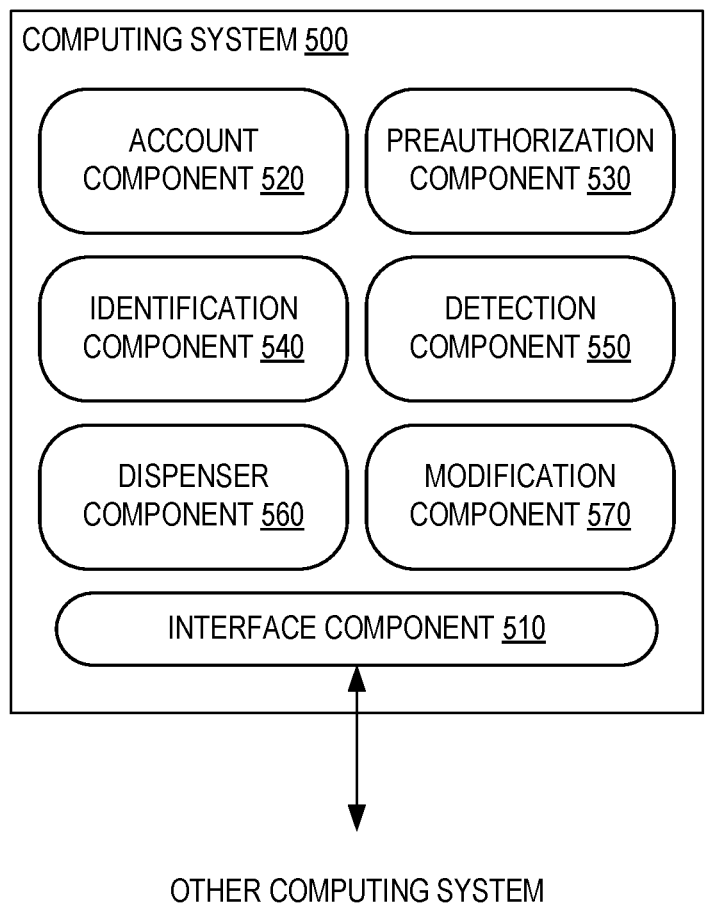
FIG. 5 is a block diagram illustrating example components that may be used to process preauthorized financial transactions in an ecosystem, such as the ecosystem shown in FIG. 2.

FIG. 5 is a block diagram illustrating a computing system 500 (e.g., cashier system 220, system server 240) including an interface component 510, an account component 520, a preauthorization component 530, an identification component 540, a detection component 550, a dispenser component 560, and/or a modification component 570 that may be used to process one or more preauthorized financial transactions in the ecosystem 200.

In some embodiments, the interface component 510 enables the computing system 500 to receive data from and/or transmit data to one or more other computing systems (e.g., user device 210, cashier system 220, merchant device 230, system server 240, cash machine 250). For example, the interface component 510 may be coupled to another computing system to facilitate communication between the other computing system and the account component 520, the preauthorization component 530, the identification component 540, the detection component 550, the dispenser component 560, and/or the modification component 570. In some embodiments, the interface component 510 facilitates communication between and among the account component 520, the preauthorization component 530, the identification component 540, the detection component 550, the dispenser component 560, and/or the modification component 570.

The account component 520 enables the computing system 500 to manage data associated with one or more accounts (e.g., cardholder account 320). Account data stored and/or maintained at or by the computing system 500 may include data registered with the computing system 500, such as credential data 322, contact data 344, and/or preference data 346. In some embodiments, the account component 520 uses credential data 322 to selectively allow one or more users (e.g., user 202) to access and use account data associated with the cardholder account 320. For example, the credential data 322 may be used to authenticate the user 202 as being an authorized user of the cardholder account 320. In some embodiments, the account component 520 uses contact data 344 to communicate with one or more other computing systems associated with the cardholder account 320 (e.g., user device 210). For example, contact data may be used to locate and/or approach a user device 210 for communicating with a user of the user device 210 (e.g., user 202).

The account component 520 is configured to process one or more registration requests to register data with the computing system 500. Various identifiers (e.g., biometric identifier, device identifier, card identifier), for example, may be registered with the computing system 500 to associate a user 202, a user device 210, and/or an access card 310 with the cardholder account 320. For another example, user preferences may be registered with the computing system 500 to enroll an entity (e.g., user 202, user device 210, access card 310) and/or an account (e.g., cardholder account 320) in a nonvisual communication program. The account component 520 is configured to register data with the computing system 500 such that the interface component 510, account component 520, the preauthorization component 530, the identification component 540, the detection component 550, the dispenser component 560, and/or the modification component 570 may access and/or use the data in an efficient manner.

The preauthorization component 530 enables the computing system 500 to identify a preauthorized financial transaction and an account associated with the preauthorized financial transaction. The preauthorization component 530 is configured to communicate (e.g., via the interface component 510) with another computing system (e.g., user device 210, cashier system 220, merchant device 230, system server 240, cash machine 250) to obtain a message associated with a financial transaction, such as a request for preauthorization and/or a preauthorization message (e.g., machine instruction 352). A message may indicate that the financial transaction is associated with a nonvisual communication program. In some embodiments, the preauthorization component 530 identifies a transaction amount 314 and an account associated with the financial transaction (e.g., cardholder account 320).

The identification component 540 enables the computing system 500 to identify one or more parameters associated with a preauthorized financial transaction. The identification component 540 is configured to communicate with the account component 520 (e.g., via the interface component 510) to access the cardholder account 320 to identify account data (e.g., credential data 322, contact data 344, preference data 346) registered with the computing system 500. In some embodiments, the identification component 540 identifies a transaction timeframe 332 in which preauthorized funds may be captured and/or one or more cash machines 250 at which the preauthorized funds may be captured. The transaction timeframe 332 and/or cash machines 250 may be identified and/or determined based on time data 336, machine location data 338 and/or user location data 340.

For example, a current location (e.g., based on user location data 340), a destination (e.g., based on machine location data 338), and a travel rate for traversing a distance between a geolocation of the user 202 and a geolocation of the cash machine 250 may be used to determine the transaction timeframe 332. For another example, a current location (e.g., based on user location data 340), a travel time (e.g., based on time data 336), and a travel rate may be used to determine an area around a geolocation of the user 202 that is traversable within the amount of time associated with the time data 336. The area may be analyzed to identify one or more cash machines 250 physically located in the area. If a plurality of cash machines 250 are identified, a plurality of machine identifiers 334 associated with the identified cash machines 250 may be transmitted to a user device 210 for prompting the user 202 to select or identify, from the plurality of cash machines 250, a set of cash machines 250 at which the preauthorized funds may be captured.

The detection component 550 enables the computing system 500 to authenticate a user proximate to the cash machine 250 as an authorized user of an account (e.g., cardholder account 320). In some embodiments, the detection component 550 determines whether a cardholder (e.g., user 202) of an account associated with a preauthorized financial transaction (e.g., cardholder account 320) is proximate to the cash machine 250. Upon determining that the user 202 is proximate to the cash machine 250, the detection component 550 identifies a capture time 362 associated with the preauthorized financial transaction, and determines whether the capture time 362 satisfies the transaction timeframe 332.

For example, a transmission may be detected and analyzed to determine whether a source of the transmission (e.g., user device 210, access card 310) is associated with the cardholder account 320. The transmission may include or indicate an identifier associated with the source (e.g., device identifier, card identifier). Additionally or alternatively, scan data associated with one or more objects detected in a predetermined scan area may be analyzed to identify one or more identifiers (e.g., biometric identifier, device identifier, card identifier). The detection component 550 compares one or more identifiers with account data registered with the computing system 500 (e.g., credential data 322, contact data 344). If an identifier matches or corresponds to credential data 322 and/or contact data 344, the user 202 is determined to be proximate to the cash machine 250.

For another example, position data 342 associated with a user device 210 and/or access card 310 associated with the cardholder account 320 is obtained. Contact data 344 registered with the computing system 500, for example, may be used to identify the user device 210 and/or access card 310 and communicate with the user device 210 and/or access card 310 for obtaining the position data 342. The detection component 550 analyzes the position data 342 to determine whether the user 202 is proximate to the cash machine 250. If a geolocation associated with the position data 342 (e.g., a device location) is proximate to a geolocation associated with the cash machine 250 (e.g., a machine location), the user 202 is determined to be proximate to the cash machine 250.

The dispenser component 560 enables the computing system 500 to dispense cash in accordance with the nonvisual communication program. In some embodiments, the dispenser component 560 obtains a denomination breakdown 372 corresponding to a transaction amount 314, and dispenses the transaction amount 314 of cash in accordance with the denomination breakdown 372. In some embodiments, the dispenser component 560 dispenses cash in a predetermined order, grouping, cadence, or timing of denominations that allows the user 202 to confirm or verify that the transaction amount 314 of cash was dispensed. Upon dispensing the transaction amount 314 of cash, the dispenser component 560 generates a notification 374 that is indicative of the transaction amount 314 of cash being dispensed.

The modification component 570 enables the computing system 500 to modify the transaction timeframe 332 in which the preauthorized financial transaction may be carried out and/or identify another cash machine 250 at which the preauthorized financial transaction may be carried out. In some embodiments, the modification component 570 determines whether a hold duration 376 associated with the preauthorized financial transaction exceeds a predetermined hold threshold 378. If the hold duration 376 exceeds the predetermined hold threshold 378, the modification component 570 generates a request to modify the transaction timeframe 332 and/or identify another cash machine 250.

Figure 6:
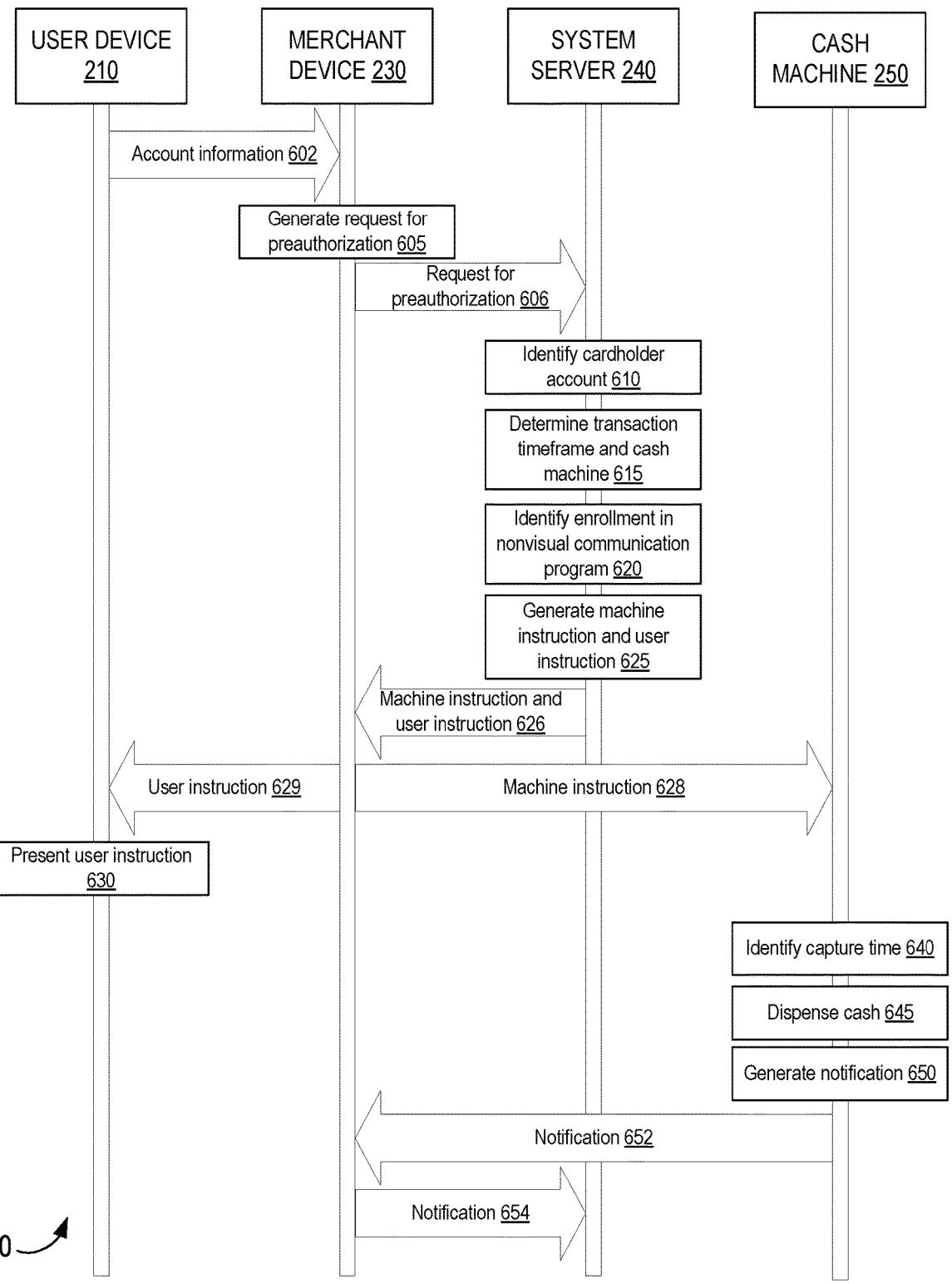
FIG. 6 is a sequence diagram of an example method for processing preauthorized financial transactions in an ecosystem, such as the ecosystem shown in FIG. 2.

FIG. 6 is a sequence diagram illustrating an example method 600 for processing a preauthorized financial transaction in the ecosystem 200. In some embodiments, a user device 210 transmits at 602 account information and a transaction amount 314 to a merchant device 230. The merchant device 230 uses the account information and the transaction amount 314 to generate at 605 a request for preauthorization. The request for preauthorization is transmitted at 606 to a system server 240 for processing.

Upon receiving the request for preauthorization, the system server 240 identifies at 610 a cardholder account 320 used to enter into the financial transaction. The request for preauthorization may be analyzed to determine whether to approve the request for preauthorization. If the request for preauthorization is approved, the system server 240 determines at 615 a transaction timeframe 332 in which the financial transaction may be carried out and one or more cash machines 250 at which the preauthorized funds may be captured.

In some embodiments, the system server 240 identifies at 620 that the cardholder account 320 is enrolled in a nonvisual communication program. Upon identifying that the cardholder account 320 is enrolled in the nonvisual communication program, the system server 240 generates at 625 a machine instruction 352 and a user instruction 354 in accordance with the nonvisual communication program, and transmits at 626 a response to the request for preauthorization, including the machine instruction 352 and the user instruction 354, to the merchant device 230. Alternatively, the merchant device 230 may identify that the cardholder account 320 is enrolled in the nonvisual communication program, and generate the machine instruction 352 and/or the user instruction 354 in accordance with the nonvisual communication program.

The merchant device 230 transmits at 628 the machine instruction 352 to a cash machine 250, and transmits at 629 the user instruction 354 to the user device 210. Alternatively, the system server 240 may transmit the machine instruction 352 directly to the cash machine 250, and/or transmit the user instruction 354 directly to the user device 210. The user device 210 presents at 630 the user instruction 354 to a user of the user device 210 (e.g., user 202) to enable the user to carry out the financial transaction. In some embodiments, the user instruction 354 is transmitted to a user device 210 associated with the cardholder account 320 other than the user device 210 used to enter into the financial transaction (e.g., a mobile device) for presentation.

Upon receiving the machine instruction 352, the cash machine 250 is configured to carry out the financial transaction in accordance with the nonvisual communication program. The cash machine 250 identifies at 640 a capture time 362 that is indicative of the user 202 being proximate to the cash machine 250, and dispenses at 645 cash to the user 202. The cash may be dispensed, for example, in accordance with a denomination breakdown 372. Upon dispensing the cash, the cash machine 250 generates at 650 a notification 374 associated with the dispensed cash, and transmits at 652 the notification 374 to the merchant device 230. The merchant device 230 transmits at 654 the notification 374 to the system server 240 to enable the system server 240 to identify that the financial transaction is carried out. In some embodiments, the cash machine 250 transmits the notification 374 directly to the system server 240.

Figure 7:
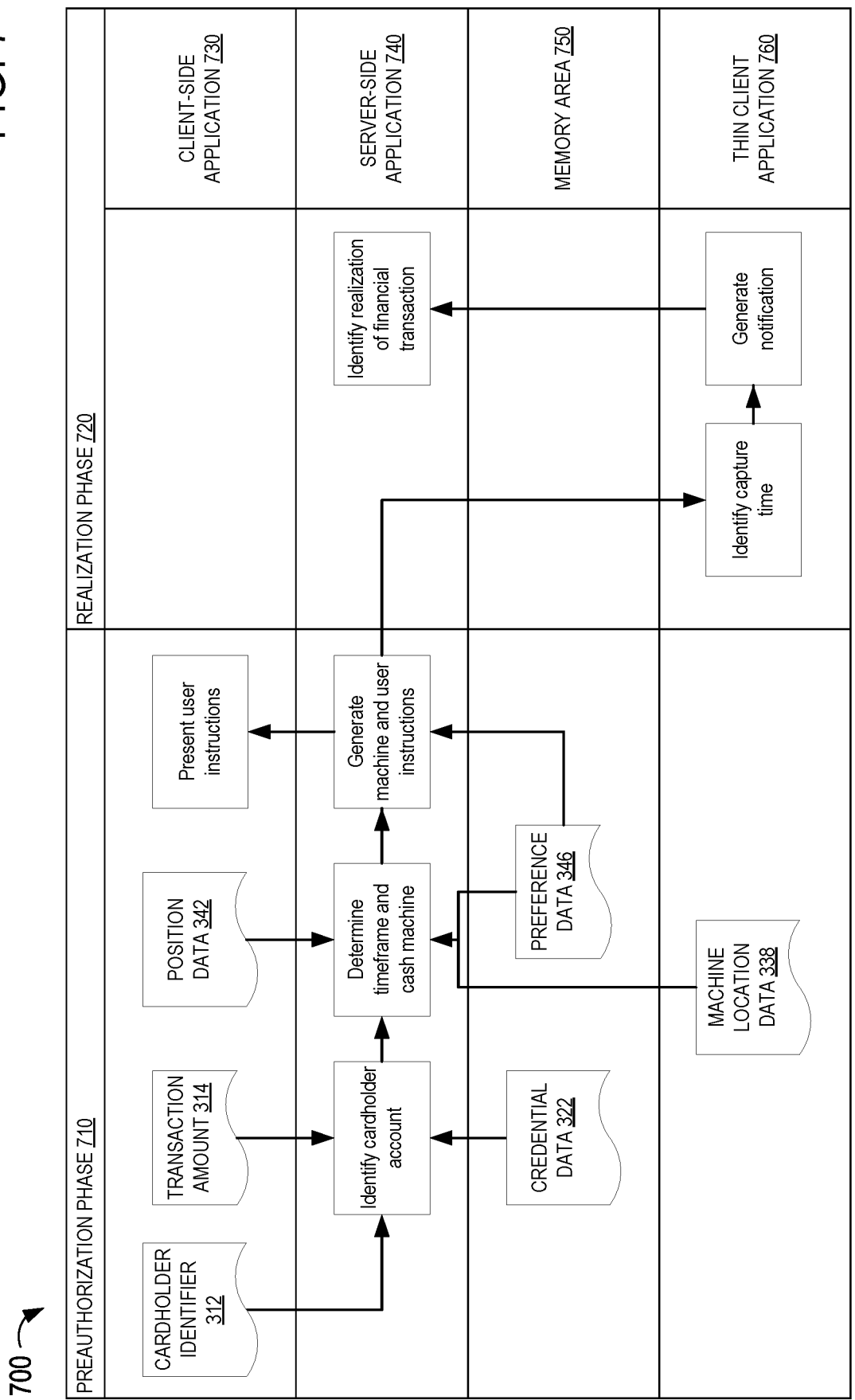
FIG. 7 is a flow diagram of an example dataflow for processing preauthorized financial transactions in an ecosystem, such as the ecosystem shown in FIG. 2.

FIG. 7 is a flow diagram illustrating an example dataflow 700 for preauthorizing a financial transaction and carrying out the preauthorized financial transaction in the ecosystem 200. The dataflow 700 includes a preauthorization phase 710, in which a request for preauthorization of a financial transaction is processed, and a realization phase 720, in which a preauthorized financial transaction is carried out.

During the preauthorization phase 710, a user 202 may use a client-side application 730 (e.g., at a user device 210) to preauthorize an automated banking machine-related financial transaction. The client-side application 730 may be used, for example, to provide a cardholder identifier 312 and a transaction amount 314 for generating a request for preauthorization. A server-side application 740 (e.g., at the merchant device 230, at the system server 240) obtains the cardholder identifier 312 and the transaction amount 314 from the client-side application 730, and identifies a cardholder account 320 associated with the cardholder identifier 312 for processing the financial transaction. Credential data 322 may be obtained from a memory area 750, and compared with the cardholder identifier 312 to identify the cardholder account 320.

The server-side application 740 determines a transaction timeframe 332 in which the financial transaction may be carried out and one or more cash machines 250 at which preauthorized funds may be captured based on time data 336, machine location data 338, and/or user location data 340. The time data 336, machine location data 338, and/or user location data 340 may be identified and/or generated at the server-side application 740. For example, the request for preauthorization may be analyzed to extract or identify time data 336, machine location data 338, and/or user location data 340. For another example, position data 342 may be obtained from the client-side application 730 to identify a geolocation of a user 202 associated with the cardholder account 320 for generating user location data 340. For yet another example, machine location data 338 may be obtained from one or more thin client applications (e.g., at one or more cash machines 250) to identify one or more geolocations of the cash machines 250 for generating machine location data 338. For yet another example, preference data 346 may be obtained from the memory area 750 to identify, generate, and/or modify time data 336, machine location data 338, and/or user location data 340.

The server-side application 740 determines whether the cardholder account 320 is enrolled in a nonvisual communication program. Preference data 346 associated with the cardholder account 320, for example, may be used to determine an enrollment status. If the cardholder account 320 is enrolled in the nonvisual communication program, the server-side application 740 generates a machine instruction 352 and a user instruction 354 in accordance with the nonvisual communication program.

The machine instruction 352 enables the thin client application 760 to perform one or more operations for carrying out the financial transaction. The user instruction 354 enables the client-side application 730 to instruct a user of the client-side application 730 (e.g., the user 202) to perform one or more operations for carrying out the financial transaction. For example, the user 202 may approach a cash machine 250 identified in the user instruction 354 within the transaction timeframe 332 to capture the preauthorized funds at the cash machine 250.

The dataflow 700 enters the realization phase 720 when a capture time 362 is identified. The thin client application 760 may identify the capture time 362 upon identifying a user 202 proximate to the cash machine 250. Identifying a user 202, or an object associated with the user 202, at the thin client application 760, for example, may be indicative of the user 202 being proximate to the cash machine 250. In some embodiments, the thin client application 760 communicates with the client-side application 730 to authenticate the user 202. If the capture time 362 satisfies the transaction timeframe 332, cash is dispensed at the cash machine 250 in accordance with the nonvisual communication program. Upon identifying that the cash has been dispensed, the thin client application 760 generates a notification 374 associated with the cash being dispensed. The notification 374 may be obtained, for example, at the server-side application 740.

Figure 8:
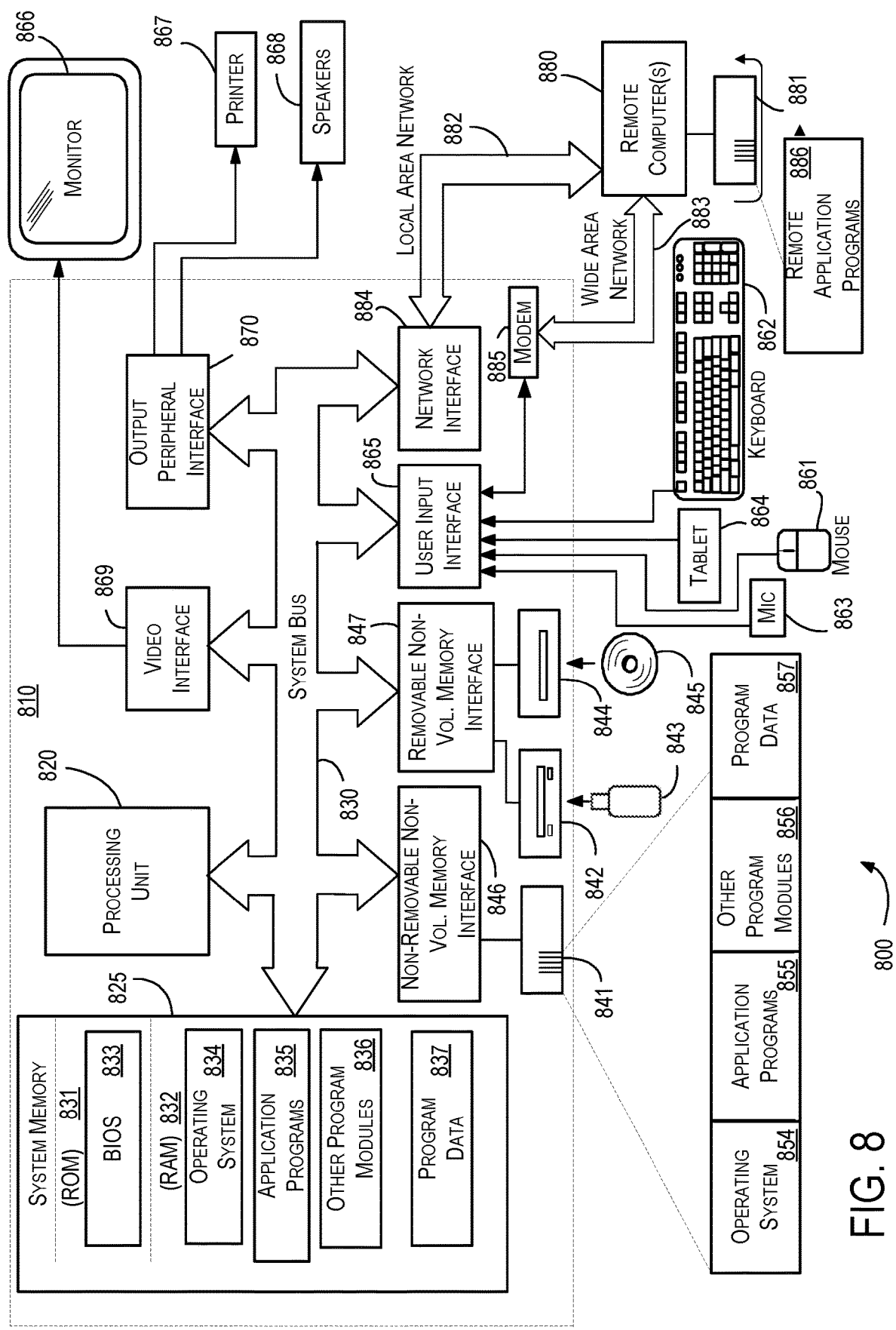
FIG. 8 is a block diagram illustrating an example operating environment in which financial transactions may be processed.

FIG. 8 is a block diagram illustrating an example operating environment 800 that may be used to process one or more financial transactions. The operating environment 800 is only one example of a computing and networking environment and is not intended to suggest any limitation as to the scope of use or functionality of the disclosure. The operating environment 800 should not be interpreted as having any dependency or requirement relating to any one or combination of components illustrated in the example operating environment 800.

The disclosure is operational with numerous other computing and networking environments or configurations. While some embodiments of the disclosure are illustrated and described herein with reference to the operating environment 800 being or including a merchant device 230 (shown in FIG. 2), a system server 240 (shown in FIG. 2), a computing system 500 (shown in FIG. 5), and/or a server-side application 740 (shown in FIG. 7), aspects of the disclosure are operable with any computing system (e.g., user device 210, cashier system 220, cash machine 250, access card 310) that executes instructions to implement the operations and functionality associated with the operating environment 800.

For example, the operating environment 800 may include a mobile device, a tablet, a laptop computer, a desktop computer, a server computer, a microprocessor-based system, a multiprocessor system, a communication devices in a wearable or accessory form factor (e.g., a watch, glasses, a headset, earphones, and the like), programmable consumer electronics, a portable media player, a gaming console, a set top box, a kiosk, a tabletop device, an industrial control device, a minicomputer, a mainframe computer, a network computer, a distributed computing environment that includes any of the above systems or devices, and the like. The operating environment 800 may represent a group of processing units or other computing systems. Additionally, any computing system described herein may be configured to perform any operation described herein including one or more operations described herein as being performed by another computing system.

With reference to FIG. 8, an example system for implementing various aspects of the disclosure may include a general purpose computing system in the form of a computer 810. Components of the computer 810 may include, but are not limited to, a processing unit 820 (e.g., a processor), a system memory 825 (e.g., a computer-readable storage device), and a system bus 830 that couples various system components including the system memory 825 to the processing unit 820. The system bus 830 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 825 includes any quantity of media associated with or accessible by the processing unit 820. For example, the system memory 825 may include computer storage media in the form of volatile and/or nonvolatile memory, such as read only memory (ROM) 831 and random access memory (RAM) 832. The ROM 831 may store a basic input/output system (BIOS) 833 that facilitates transferring information between elements within computer 810, such as during start-up. The RAM 832 may contain data and/or program modules that are immediately accessible to and/or presently being operated on by processing unit 820. For example, the system memory 825 may store computer-executable instructions, application data, transaction data, identifier data, profile data, time data, location data, and other data. By way of example, and not limitation, FIG. 8 illustrates operating system 834, application programs 835, other program modules 836, and program data 837.

The computer 810 includes a variety of computer-readable media. Computer-readable media may be any available media that may be accessed by the computer 810 and includes both volatile and nonvolatile media, and removable and non-removable media. By way of example, and not limitation, computer-readable media may comprise computer storage media and communication media. Computer storage media are tangible and mutually exclusive to communication media.

Computer storage media includes volatile and nonvolatile, removable and non-removable media implemented in any method or technology, such as semiconductor, magnetic, or optical technologies, for storage of information, such as computer-executable instructions, data structures, program modules or other data. Example computer storage media includes, but is not limited to, ROM 831, RAM 832, electrically erasable programmable read-only memory (EEPROM), solid-state memory, flash memory, a hard disk, magnetic storage, floppy disk, magnetic tape, a compact disc (CD), a digital versatile disc (DVD), a BLU-RAY DISC® brand optical disc, an ultra density optical (UDO) disc, or any other medium which may be used to store the desired information and which may be accessed by the computer 810. (BLU-RAY DISC® is a registered trademark of Blu-ray Disc Association located in Burbank, Calif.). Computer storage media are implemented in hardware and exclude carrier waves and propagated signals. Computer storage media for purposes of this disclosure are not signals per se.

Communication media typically embodies computer-executable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

By way of example only, FIG. 8 illustrates a hard disk drive 841 that reads from or writes to non-removable, nonvolatile magnetic media, a universal serial bus (USB) port 842 that provides for reads from or writes to a removable, nonvolatile memory 843, and an optical disk drive 844 that reads from or writes to a removable, nonvolatile optical disk 845. Other removable/non-removable, volatile/nonvolatile computer storage media that may be used in the example operating environment include, but are not limited to, solid state memory, flash memory, and the like. The hard disk drive 841 may be connected to the system bus 830 through a non-removable memory interface such as interface 846, and magnetic disk drive 842 and optical disk drive 844 may be connected to the system bus 830 by a removable memory interface, such as interface 847.

The drives and their associated computer storage media, described above and illustrated in FIG. 8, provide storage of computer-executable instructions, data structures, program modules, applications, components (e.g., interface component 510, account component 520, preauthorization component 530, identification component 540, detection component 550, dispenser component 560, modification component 570), and other data for the computer 810. In FIG. 8, for example, hard disk drive 841 is illustrated as storing operating system 854, application programs 855, other program modules 856 and program data 857. Note that these components may either be the same as or different from operating system 834, application programs 835, other program modules 836, and program data 837. Operating system 854, application programs 855, other program modules 856, and program data 857 are given different numbers herein to illustrate that, at a minimum, they are different copies.

The processing unit 820 includes any quantity of processing units, and the instructions may be performed by the processing unit 820 or by multiple processors within the operating environment 800 or performed by a processor external to the operating environment 800. The processing unit 820 may be programmed to execute the computer-executable instructions for implementing aspects of the disclosure, such as those illustrated in the figures (e.g., FIGS. 4, 6, and 7). For example, the processing unit 820 may execute an interface component 510 (shown in FIG. 5), an account component 520 (shown in FIG. 5), a preauthorization component 530 (shown in FIG. 5), an identification component 540 (shown in FIG. 5), a detection component 550 (shown in FIG. 5), a dispenser component 560 (shown in FIG. 5), and/or a modification component 570 (shown in FIG. 5) for implementing aspects of the disclosure.

Upon programming or execution of these components, the operating environment 800 and/or processing unit 820 is transformed into a special purpose microprocessor or machine. For example, the preauthorization component 530, when executed by the processing unit 820, causes the computer 810 to obtain a preauthorization message associated with a financial transaction, and analyze the preauthorization message to identify a transaction amount and a cardholder account associated with the financial transaction; the detection component 550, when executed by the processing unit 820, causes the computer 810 to determine that a cardholder associated with the cardholder account is proximate to a cash machine, identify a capture time associated with the financial transaction, and determine whether the capture time satisfies the transaction timeframe; and the dispenser component 560, when executed by the processing unit 820, causes the computer 810 to dispense the transaction amount of cash in accordance with a nonvisual communication program. Although the processing unit 820 is shown separate from the system memory 825, embodiments of the disclosure contemplate that the system memory 825 may be onboard the processing unit 820 such as in some embedded systems.

A user may enter commands and information into the computer 810 through one or more input devices, such as a pointing device 861 (e.g., mouse, trackball, touch pad), a keyboard 862, a microphone 863, and/or an electronic digitizer 864 (e.g., on a touchscreen). Other input devices not shown in FIG. 8 may include a joystick, a game pad, a controller, a satellite dish, a camera, a scanner, an accelerometer, or the like. The computer 810 may accept input from the user in any way, including from input devices, via gesture input, via proximity input (such as by hovering), and/or via voice input. These and other input devices may be coupled to the processing unit 820 through a user input interface 865 that is coupled to the system bus 830, but may be connected by other interface and bus structures, such as a parallel port, game port or the USB port 842.

Information, such as text, images, audio, video, graphics, alerts, and the like, may be presented to a user via one or more presentation devices, such as a monitor 866, a printer 867, and/or a speaker 868. Other presentation devices not shown in FIG. 8 may include a projector, a vibrating component, or the like. These and other presentation devices may be coupled to the processing unit 820 through a video interface 869 (e.g., for a monitor 866 or a projector) and/or an output peripheral interface 870 (e.g., for a printer 867, a speaker 868, and/or a vibration component) that are coupled to the system bus 830, but may be connected by other interface and bus structures, such as a parallel port, game port or the USB port 842. In some embodiments, the presentation device is integrated with an input device configured to receive information from the user (e.g., a capacitive touch-screen panel, a controller including a vibrating component). Note that the monitor 866 and/or touch screen panel may be physically coupled to a housing in which the computer 810 is incorporated, such as in a tablet-type personal computer.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more LANs 882 and one or more WANs 883, but may also include other networks. Such networking environments are commonplace in offices, enterprise-wide computer networks, intranets and the Internet.

When used in a LAN networking environment, the computer 810 is coupled to the LAN 882 through a network interface or adapter 884. When used in a WAN networking environment, the computer 810 may include a modem 885 or other means for establishing communications over the WAN 883, such as the Internet. The modem 885, which may be internal or external, may be connected to the system bus 830 via the user input interface 865 or other appropriate mechanism. A wireless networking component including an interface and antenna may be coupled through a device, such as an access point or peer computer to a LAN 882 or WAN 883. In a networked environment, program modules depicted relative to the computer 810, or portions thereof, may be stored in the remote memory storage device. By way of example, and not limitation, FIG. 8 illustrates remote application programs 886 as residing on memory storage device 881. It may be appreciated that the network connections shown are examples and other means of establishing a communications link between the computers may be used.

The block diagram of FIG. 8 is merely illustrative of an example system that may be used in connection with one or more examples of the disclosure and is not intended to be limiting in any way. Further, peripherals or components of the computing systems known in the art are not shown, but are operable with aspects of the disclosure. At least a portion of the functionality of the various elements in FIG. 8 may be performed by other elements in FIG. 8, or an entity (e.g., processor, web service, applications, server, computing system, etc.) not shown in FIG. 8.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile devices, tablets laptop computers, desktop computers, server computers, microprocessor-based systems, multiprocessor systems, programmable consumer electronics, communication devices in wearable or accessory form factors, portable media players, gaming consoles, set top boxes, kiosks, tabletop devices, industrial control devices, minicomputers, mainframe computers, network computers, distributed computing environments that include any of the above systems or devices, and the like.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

The embodiments illustrated and described herein as well as embodiments not specifically described herein but within the scope of aspects of the disclosure constitute example means for obtaining permission using nonvisual communication to authorize one or more transactions. For example, the elements illustrated in FIGS. 1-3, 5, and 8, such as when encoded to perform the operations illustrated in FIGS. 4, 6, and 7, constitute at least an example means for identifying a request for preauthorization of a financial transaction (e.g., preauthorization component 530); an example means for determining a transaction timeframe associated with a financial transaction (e.g., identification component 540); an example means for identifying a cash machine associated with a financial transaction (e.g., identification component 540); an example means for determining whether to process a financial transaction in accordance with a nonvisual communication program (e.g., preauthorization component 530); and an example means for generating a preauthorization instruction to dispense the transaction amount of cash in accordance with a nonvisual communication program (e.g., preauthorization component 530).

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the aspects of the disclosure have been described in terms of various embodiments with their associated operations, a person skilled in the art would appreciate that a combination of operations from any number of different embodiments is also within the scope of the aspects of the disclosure.

What is claimed is:

1. A computing system for preauthorizing one or more financial transactions, the computing system comprising:
   a memory device storing data associated with one or more user accounts of a first user and computer-executable instructions; and a processor configured to execute the computer-executable instructions to:
  receive a request for preauthorization of a financial transaction from a first user device of a first user to provide a transaction amount to a second user from a cash machine, the request for preauthorization comprising transaction data including the transaction amount and a first user identifier of the first user;
  based on the first user identifier, identify an account of the one or more user accounts associated with the first user;
  based on the identification of the account, analyze the request for preauthorization to determine whether to approve the request;
  determine that the request is approved;
  determine a machine identifier of cash machine, the cash machine being configured for dispensing the transaction amount;
  transmit machine instructions to the cash machine to dispense the transaction amount;
  transmit user instructions to a second user device to enable the second user to carry out the financial transaction, the user instructions including a preauthorization code and the machine identifier of the cash machine;
  determine that a second user is proximate to cash machine; and
  determine a capture time associated with the financial transaction, wherein the cash machine is configured to dispense the transaction amount upon the capture time satisfying a current transaction timeframe, the current transaction timeframe being determined based at least on a travel rate for traversing a distance between a geolocation of the second user at a time of the receiving of the request for the preauthorization, and a geolocation of the cash machine, and the second user following the user instructions including using the preauthorization code to interact with the cash machine.

2. The computing system of claim 1, wherein the processor is further configured to execute the computer-executable instructions to:
  generate scan data associated an area proximate to the cash machine;
  analyze the scan data to determine whether the second user is proximate to the cash machine; and
  based on determining that the second user is proximate to the cash machine, obtain data from the second user device to authenticate the second user.

3. The computing system of claim 1, wherein the geolocation of the cash machine is determined using a global positioning system (GPS).

4. The computing system of claim 1, wherein a current geolocation of the second user is determined based on global positioning system (GPS) data of the second user device.

5. The computing system of claim 1, wherein transmitting machine instructions to the cash machine includes transmitting the preauthorization code and the capture time to the cash machine for use during the interaction of the second user with the cash machine.

6. The computing system of claim 1, further comprising a detection component that detects proximity of the second user device of the second user to the cash machine remote from the first user device of the first user based on communications with the cash machine and the second user device via a communication network.

7. The computing system of claim 1, wherein the processor is further configured to execute the computer-executable instructions to:
  determine that the request is approved, the capture time is not yet determined, and a hold duration associated with the transaction amount satisfies one or more hold thresholds; and
  based on determining that the hold duration satisfies the one or more hold thresholds, identify a different cash machine that is closer to a current geolocation of the second user than a current cash machine or increase the current transaction timeframe by a fixed duration.

8. A computer-implemented method for preauthorizing one or more financial transactions, the computer-implemented method comprising:
  receiving a request for preauthorization of a financial transaction from a first user device of a first user to provide a transaction amount to a second user from a cash machine, the request for preauthorization comprising transaction data including the transaction amount and a first user identifier of the first user;
  based on the first user identifier, identifying an account of one or more user accounts associated with the first user;
  based on the identification of the account, analyzing the request for preauthorization to determine whether to approve the request;
  determining that the request is approved;
  determining a machine identifier of cash machine, the cash machine being configured for dispensing the transaction amount;
  transmitting machine instructions to the cash machine to dispense the transaction amount;
  transmitting user instructions to a second user device to enable the second user to carry out the financial transaction, the user instructions including a preauthorization code and the machine identifier of the cash machine;
  determining that a second user is proximate to cash machine; and
  determining a capture time associated with the financial transaction, wherein the cash machine is configured to dispense the transaction amount upon the capture time satisfying a current transaction timeframe, the current transaction timeframe being determined based at least on a travel rate for traversing a distance between a geolocation of the second user at a time of the receiving of the request for the preauthorization, and a geolocation of the cash machine, and the second user following the user instructions including using the preauthorization code to interact with the cash machine.

9. The computer-implemented method of claim 8 further comprising:
  generating scan data associated an area proximate to the cash machine;
  analyzing the scan data to determine whether the second user is proximate to the cash machine; and
  based on determining that the second user is proximate to the cash machine, obtaining data from the second user device to authenticate the second user.

10. The computer-implemented method of claim 8, wherein the geolocation of the cash machine is determined using a global positioning system (GPS).

11. The computer-implemented method of claim 8, wherein a current geolocation of the second user is determined based on global positioning system (GPS) data of the second user device.

12. The computer-implemented method of claim 8, wherein transmitting machine instructions to the cash machine includes transmitting the preauthorization code and the capture time to the cash machine for use during the interaction of the second user with the cash machine.

13. The computer-implemented method of claim 8 further comprising:
    determining that the request is approved, and the capture time is not yet determined, and a hold duration associated with the transaction amount satisfies one or more hold thresholds; and
    based determining that the hold duration satisfies the one or more hold thresholds, increasing the current transaction timeframe by a fixed duration.

14. The computer-implemented method of claim 8 further comprising:
    determining that the request is approved, the capture time is not yet determined, and a hold duration associated with the transaction amount satisfies one or more hold thresholds; and
    based on determining that the hold duration satisfying the one or more hold thresholds, identifying a different cash machine that is closer to the geolocation of the second user than a current cash machine.

15. A non-transitory computer-readable storage medium having computer-executable instructions embodied thereon, wherein, upon execution by at least one processor, the computer-executable instructions cause the processor to:
    receive a request for preauthorization of a financial transaction from a first user device of a first user to provide a transaction amount to the second user from a cash machine, the request for preauthorization comprising transaction data including the transaction amount and a first user identifier of the first user;
    based on the first user identifier, identify an account of one or more user accounts associated with the first user;
    based on the identification of the account, analyze the request for preauthorization to determine whether to approve the request;
    determining that the request is approved;
    determining a machine identifier of cash machine, the cash machine being configured for dispensing the transaction amount;
    transmitting machine instructions to the cash machine to dispense the transaction amount;
    transmitting user instructions to a second user device to enable the second user to carry out the financial transaction, the user instructions including a preauthorization code and the machine identifier of the cash machine;
    determining that a second user is proximate to cash machine; and
    determining a capture time associated with the financial transaction, wherein the cash machine is configured to dispense the transaction amount upon the capture time satisfying a current transaction timeframe, the current transaction timeframe being determined based at least on a travel rate for traversing a distance between a geolocation of the second user at a time of the receiving of the request for the preauthorization, and a geolocation of the cash machine, and the second user following the user instructions including using the preauthorization code to interact with the cash machine.

16. The non-transitory computer-readable storage medium of claim 15, wherein, upon execution by the at least one processor, the computer-executable instructions further cause the processor to:
    generate scan data associated an area proximate to the cash machine;
    analyze the scan data to determine whether the second user is proximate to the cash machine; and
    based on determining that the second user is proximate to the cash machine, obtain data from the second user device to authenticate the second user.

17. The non-transitory computer-readable storage medium of claim 15, wherein the geolocation of the cash machine is determined using a global positioning system (GPS).

18. The non-transitory computer-readable storage medium of claim 15 wherein a current geolocation of the second user is determined based on global positioning system (GPS) data of the second user device.

19. The non-transitory computer-readable storage medium of claim 15, wherein transmitting machine instructions to the cash machine includes transmitting the preauthorization code and the capture time to the cash machine for use during the interaction of the second user with the cash machine.

20. The non-transitory computer-readable storage medium of claim 15, wherein, upon execution by the at least one processor, the computer-executable instructions further cause the processor to:
    determine that the request is approved, the capture time is not yet determined, and a hold duration associated with the transaction amount satisfies one or more hold thresholds; and
    based on determining that the hold duration satisfies the one or more hold thresholds, increase the current transaction timeframe by a fixed duration.

* * * * *